United States Patent
Tsubaki

(10) Patent No.: US 10,526,009 B2
(45) Date of Patent: Jan. 7, 2020

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/777,730

(22) PCT Filed: Oct. 13, 2017

(86) PCT No.: PCT/JP2017/037145
§ 371 (c)(1),
(2) Date: May 21, 2018

(87) PCT Pub. No.: WO2018/070511
PCT Pub. Date: Apr. 19, 2018

(65) Prior Publication Data
US 2019/0337556 A1    Nov. 7, 2019

(30) Foreign Application Priority Data

Oct. 14, 2016    (JP) ................................ 2016-202804

(51) Int. Cl.
*B62D 5/04* (2006.01)
*B62D 6/00* (2006.01)
*B62D 15/02* (2006.01)

(52) U.S. Cl.
CPC ......... *B62D 5/0472* (2013.01); *B62D 5/0463* (2013.01); *B62D 6/002* (2013.01); *B62D 6/007* (2013.01); *B62D 15/0285* (2013.01)

(58) Field of Classification Search
CPC .... B62D 5/0472; B62D 5/0463; B62D 6/002; B62D 6/007; B62D 15/0285
See application file for complete search history.

(56) References Cited

U.S. PATENT DOCUMENTS

2008/0142293 A1*  6/2008  Goto ...................... B62D 6/003
                                                        180/446
2012/0179349 A1*  7/2012  Yamakado ............ B60T 8/1755
                                                        701/89

(Continued)

FOREIGN PATENT DOCUMENTS

JP              3917008 B2      5/2007
JP         2013-252729 A       12/2013

(Continued)

OTHER PUBLICATIONS

International Search Report for PCT/JP2017/037145 dated Jan. 16, 2018 [PCT/ISA/210].

*Primary Examiner* — Sze-Hon Kong
(74) *Attorney, Agent, or Firm* — Sughrue Mion, PLLC

(57) ABSTRACT

An electric power steering apparatus that reduces uncomfortable feeling to a driver in steering angle control by improving followability of an actual steering angle to a target steering angle, and performs efficient damping to a vibration of a vehicle. The apparatus includes a torque control section that calculates a first motor current command value based on a steering torque and so on, a target steering angle generating section that generates a target steering angle based on vehicle information, and a steering angle control section that calculates a second motor current command value based on the target steering angle, an actual steering angle and so on, and calculates the motor current command value by the first and second motor current command values.

20 Claims, 16 Drawing Sheets

(56) References Cited

U.S. PATENT DOCUMENTS

| | | | |
|---|---|---|---|
| 2015/0191200 A1 | 7/2015 | Tsubaki et al. | |
| 2015/0239442 A1* | 8/2015 | Yamakado | B60L 3/102 |
| | | | 701/70 |
| 2015/0329142 A1* | 11/2015 | Takeda | B62D 6/003 |
| | | | 701/41 |
| 2016/0288830 A1* | 10/2016 | Hori | B62D 15/025 |
| 2018/0186372 A1* | 7/2018 | Shimizu | B62D 6/00 |

FOREIGN PATENT DOCUMENTS

| | | |
|---|---|---|
| JP | 2014-54885 A | 3/2014 |
| JP | 2014-223857 A | 12/2014 |
| JP | 2015-217707 A | 12/2015 |
| WO | 2014/136515 A1 | 9/2014 |
| WO | 2017/150445 A1 | 9/2017 |

* cited by examiner

PRIOR ART

ELECTRIC POWER STEERING APPARATUS

CROSS REFERENCE TO RELATED APPLICATIONS

This application is a National Stage of International Application No. PCT/JP2017/037145, filed on Oct. 13, 2017, which claims priority from Japanese Patent Application No. 2016-202804, filed on Oct. 14, 2016.

TECHNICAL FIELD

The present invention relates to an electric power steering apparatus that enables manual steering and automatic steering by performing assist control and steering angle control to a steering system by driving and controlling a motor based on a motor current command value, and in particular to an electric power steering apparatus that reduces an influence of vehicle vibration by compensating a target steering angle being a target value in the steering angle control based on vehicle information.

BACKGROUND ART

An electric power steering apparatus (EPS) which provides a steering system of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism, and performs assist control. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears (worm gears) 3 constituting the reduction mechanism, universal joints 4a and 4b, a rack-and-pinion mechanism 5, and tie rods 6a and 6b, further via hub units 7a and 7b. In addition, a torsion bar is inserted into the column shaft 2, for which a steering angle sensor 14 for detecting a steering angle θ of the steering wheel 1 by means of a twist angle of the torsion bar and a torque sensor 10 for detecting a steering torque Tt are provided, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command on the basis of the steering torque Tt detected by the torque sensor 10 and a vehicle speed V detected by a vehicle speed sensor 12, and controls a current supplied to the motor 20 by means of a voltage control command value Vref obtained by performing compensation or the like to the current command value.

Moreover, the steering angle sensor 14 is not essential, it does not need to be provided, and it is possible to obtain the steering angle from a rotational angle sensor such as a resolver connected to the motor 20.

A controller area network (CAN) 40 exchanging various information of a vehicle is connected to the control unit 30, and it is possible to receive the vehicle speed V from the CAN 40. Further, it is also possible to connect a non-CAN 41 exchanging a communication, analog/digital signals, a radio wave or the like except with the CAN 40 to the control unit 30.

The control unit 30 mainly comprises a CPU (including an MPU, an MCU and so on), and general functions performed by programs within the CPU are shown in FIG. 2.

The control unit 30 will be described with reference to FIG. 2. As shown in FIG. 2, the steering torque Tt detected by the torque sensor 10 and the vehicle speed V detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 on the basis of the inputted steering torque Tt and vehicle speed V and by using an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B. The inverter 37 is comprised of a bridge circuit of field effect transistors (FETs) as semiconductor switching elements.

A rotational angle sensor 21 such as a resolver is connected to the motor 20, and a rotational angle (a motor rotational angle) θe is detected and outputted by the rotational angle sensor 21.

Further, a compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 at an adding section 344, further adds the result of addition performed at the adding section 344 with a convergence 341 at an adding section 345, and then outputs the result of addition performed at the adding section 345 as the compensation signal CM.

With respect to such an electric power steering apparatus (EPS), the EPS has been applied to a vehicle equipped with a parking assist function by automatic steering, and further, a proposal to apply the EPS to automatic steering in automatic driving technique whose research and development has been recently advanced, has been made. Such an EPS performs assist control which a conventional EPS performs and steering angle control which controls a steering system so that a vehicle travels in a desired direction respectively. In the steering angle control, position and velocity control having superior performance for responsiveness to a target steering angle being a control target of a steering angle and a disturbance suppression characteristic to a road surface reaction force and so on, is used, for example, proportional (P) control is adopted in position control, and proportional-integral (PI) control is adopted in velocity control. Further, in order to achieve stable automatic steering, a countermeasure to a rapid fluctuation of the target steering angle and a vibration of a steering wheel has been taken.

In the publication of Japanese Patent No. 3917008 B2 (Patent Document 1), an automatic steering control apparatus is proposed that automatically performs a steering wheel operation depending on a set steering angle and aims at parking assist in particular. This apparatus can switch between a torque control mode (the assist control) and a parking assist mode (the steering angle control), and performs the control by using prestored parking data in the parking assist mode. Further, the apparatus performs the P-control in the position control of the parking assist mode, and performs the PI-control in the velocity control.

An electric power steering apparatus disclosed in Japanese Unexamined Patent Publication No. 2013-252729 A (Patent Document 2) performs precise steering in accordance with the target steering angle and smooth control to rapid change of the target steering angle by adjusting a motor current command value for automatic control to the target steering angle depending on a vehicle speed, and applying smoothness processing by a rate limiter to the target steering angle. Further, the electric power steering apparatus obtains a damping effect without a torque sensor by correcting a current command value by means of a current command value for damping obtained on the basis of a twist angle of a torsion bar.

THE LIST OF PRIOR ART DOCUMENTS

Patent Documents
Patent Document 1: Japanese Patent No. 3917008 B2
Patent Document 2: Japanese Unexamined Patent Publication No. 2013-252729 A

SUMMARY OF THE INVENTION

Problems to be Solved by the Invention

In the case of performing the steering angle control in a vehicle, a disturbance and a load state are significantly changed by a traveling vehicle speed, friction, change of a road surface reaction force and so on, so that it is necessary to adopt a control configuration being resistant to them. However, for example, in the case that the road surface reaction force changes, since a response of an actual steering angle is changed in accordance with the change of the road surface reaction force, the velocity PI-control which the apparatus described in Patent Document 1 adopts is not capable of following the target steering angle accurately, and there is a possibility that a vehicle runs off a target track.

In order to obtain the damping effect, the apparatus described in Patent Document 2 applies processing by such as a rate limiter not to a process of calculating the target steering angle but to the calculated target steering angle, so that there is a possibility that it is difficult to perform efficient damping such as damping processing meeting a factor of vibration.

The present invention has been developed in view of the above-described circumstances, and an object of the present invention is to provide an electric power steering apparatus that reduces uncomfortable feeling to a driver in steering angle control by improving followability of an actual steering angle to a target steering angle, and performing efficient damping to a vibration of a vehicle.

Means for Solving the Problems

The present invention relates to an electric power steering apparatus that drives a motor based on a motor current command value, and performs assist control and steering angle control to a steering system by driving and controlling the motor, the above-described object of the present invention is achieved by that comprising: a torque control section that calculates a first motor current command value for the assist control based on at least a steering torque; a target steering angle generating section that generates a target steering angle being a target value in the steering angle control based on vehicle information; and a steering angle control section that calculates a second motor current command value for the steering angle control based on at least the target steering angle and an actual steering angle; wherein the electric power steering apparatus calculates the motor current command value by the first motor current command value and the second motor current command value; and wherein the target steering angle generating section comprises a lateral position control section that calculates a lateral velocity command value by a deviation between a lateral position command value that is obtained based on the vehicle information and a lateral position, a lateral velocity calculating section that calculates a lateral velocity by the lateral position, a lateral velocity control section that calculates a basic target steering angle based on the lateral velocity command value and the lateral velocity, and a vehicle behavior stabilizing section that calculates a compensatory target steering angle for damping by a lateral acceleration that is obtained based on the vehicle information, and generates the target steering angle by the basic target steering angle and the compensatory target steering angle.

The above-described object of the present invention is more effectively achieved by that wherein the steering angle control section calculates the second motor current command value in accordance with I-P control based on a motor velocity command value that is calculated using the target steering angle and the actual steering angle; or wherein the lateral position control section calculates the lateral velocity command value by multiplying the deviation by a proportional gain; or wherein the lateral velocity control section calculates the basic target steering angle in accordance with I-P control using the lateral velocity command value and the lateral velocity; or wherein the vehicle behavior stabilizing section comprises a phase compensating section that performs phase compensation using a phase compensation filter and a gain section that multiplies a gain, and calculates the compensatory target steering angle by the lateral acceleration through the phase compensating section and the gain section; or wherein a characteristic of the phase compensation filter is changed depending on a vehicle speed; or wherein the target steering angle generating section further comprises a first limiting section that limits the lateral position command value by a preset first limit value; or wherein the target steering angle generating section further comprises a rate limiting section that limits a variation of the lateral position command value by a preset rate limit value; or wherein the target steering angle generating section further comprises a lateral position command value vibration eliminating section that reduces a vibration frequency component included in the lateral position command value for the lateral position command value; or wherein a characteristic that the lateral position command vibration eliminating section has is changed depending on a vehicle speed; or wherein the target steering angle generating section further comprises a lateral velocity command filter section that obtains a compensation value to improve followability of the lateral position to the lateral position command value by the lateral position command value using an FF filter, and compensates the lateral velocity command value by the compensation value; or wherein a characteristic of the FF filter is changed depending on a vehicle speed; or wherein the target steering angle generating section further comprises a second limiting section that limits the target steering angle by a preset second limit value.

Effects of the Invention

The electric power steering apparatus of the present invention enables appropriate damping because it calculates the target steering angle by applying damping processing based on the lateral acceleration. Further the electric power steering apparatus achieves vibration suppression of a response characteristic, and enables improvement of followability, by performing the steering angle control by velocity I-P control (proportional preceding type PI control).

BRIEF DESCRIPTION OF THE DRAWINGS

In the accompanying drawings:

FIGS. 11A and 11B are Bode diagrams showing an example of a frequency characteristic of a notch filter which a steering wheel vibration eliminating section has, FIG. 11A shows a gain characteristic, FIG. 11B shows a phase characteristic;

FIGS. 12A and 12B are Bode diagrams showing an example of a frequency characteristic of a filter which a steering wheel damping section has, FIG. 12A shows a gain characteristic, FIG. 12B shows a phase characteristic;

FIG. 16 is a graph showing results of time responses of a lateral position in simulations with the vehicle behavior stabilizing section and without that;

FIG. 17 is a graph showing results of time responses of a lateral acceleration in the simulations with the vehicle behavior stabilizing section and without that;

MODE FOR CARRYING OUT THE INVENTION

An electric power steering apparatus (EPS) according to the present invention performs assist control being a function of a conventional EPS and steering angle control necessary to automatic steering in parking assist and automatic driving. A torque control section and a steering angle control section operate respectively in the assist control and the steering angle control, and the EPS drives and controls a motor by switching motor current command values (a first motor current command value and a second motor current command value) outputted from respective sections. The steering angle control calculates a motor velocity command value by using a target steering angle and an actual steering angle, performs I-P control (proportional preceding type PI control) on the basis of the motor velocity command value, and calculates the motor current command value (the second motor current command value). Thereby, the EPS achieves vibration suppression of a response characteristic, and becomes a control configuration tolerant of a disturbance such as change of a road surface. Further, the EPS calculates a lateral velocity command value by using a lateral position and a lateral position command value being a target value of the lateral position, and compensates a target steering angle (a basic target steering angle) obtained by performing the I-P control on the basis of the lateral velocity command value by means of a target steering angle (a compensatory target steering angle) calculated on the basis of a lateral acceleration. Thereby, the EPS improves followability in a lateral velocity and a damping effect to vehicle vibration in a lateral direction.

Hereinafter, an embodiment of the present invention will be described with reference to the accompanying drawings.

Figure 3:
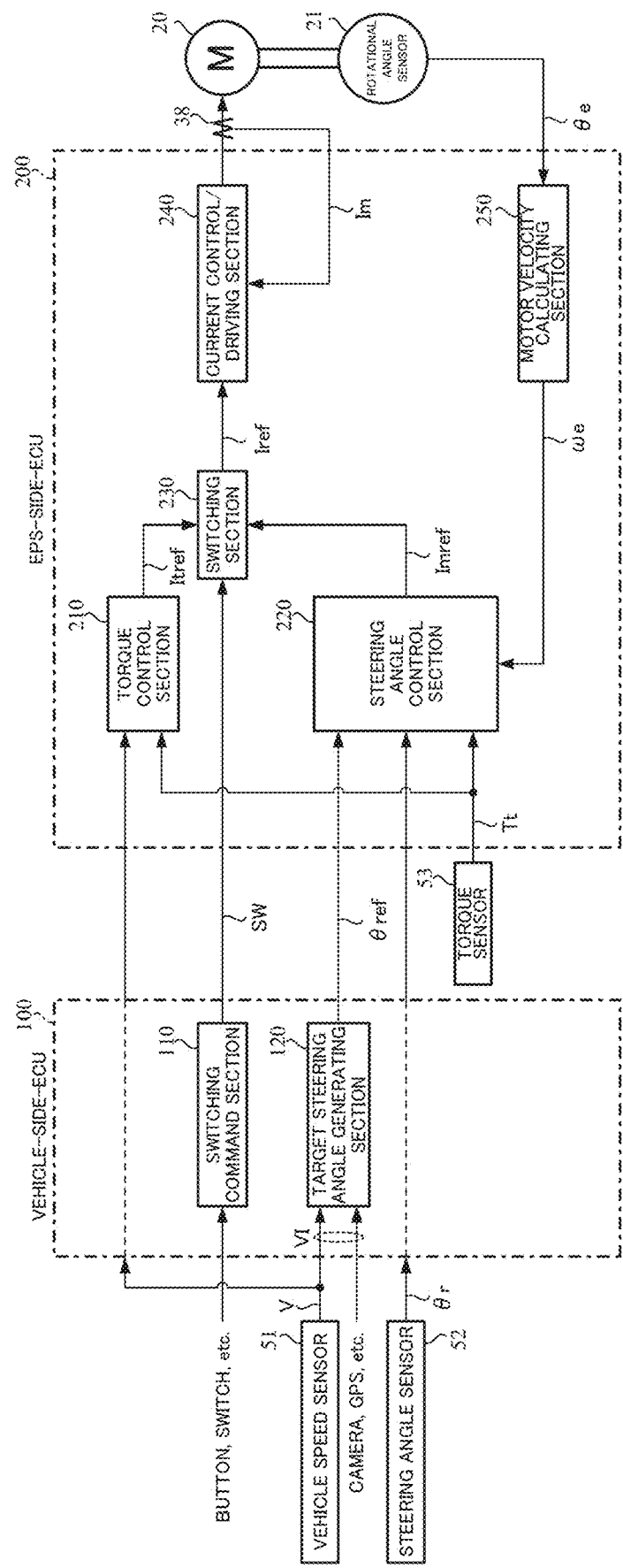
FIG. 3 is a block diagram showing a configuration example (a first embodiment) of the present invention.

FIG. 3 shows a configuration example (a first embodiment) of the present invention. A rotational angle sensor 21 such as a resolver for detecting a motor rotational angle θe is connected to a motor 20, and the motor 20 is driven and controlled through a vehicle-side-ECU (control unit) 100 and an EPS-side-ECU 200.

The vehicle-side-ECU 100 comprises a switching command section 110 which outputs a switching command SW switching an operation mode of the EPS on the basis of a button, a switch or the like indicating an intention of a driver, and a target steering angle generating section 120 which inputs a signal from a camera (an image), a Global Positioning System (GPS) or the like and a vehicle speed V from a vehicle speed sensor 51 as vehicle information VI, and generates a target steering angle θref on the basis of them. An actual steering angle θr which is detected by a steering angle sensor 52 providing for a column shaft, is inputted into a steering angle control section 220 in the EPS-side-ECU 200 through the vehicle-side-ECU 100. The vehicle speed V is also inputted into the steering angle control section 120 as the vehicle information VI, and is inputted into a torque control section 210 in the EPS-side-ECU 200 through the vehicle-side-ECU 100. Moreover, the vehicle speed V is possible to receive from a CAN or the like.

The operation mode of the EPS includes a "manual steering mode" where the EPS performs the assist control and an "automatic steering mode" where the EPS performs the steering angle control. The switching command section 110 outputs the switching command SW on the basis of a signal for discerning that the automatic steering mode is entered, for example, a signal of a button or a switch which is provided for a dashboard or in the vicinity of a steering wheel and indicates the intention of the driver, or a signal of a vehicle state determined in accordance with such as a parking mode set in a shift, and the switching command SW is inputted into a switching section 230 in the EPS-side-ECU 200.

The steering angle control section 120 generates the target steering angle θref on the basis of the vehicle information VI including the vehicle speed V, and the generated target steering angle θref is inputted into the steering angle control section 220. A detail of the steering angle control section 120 will be described later.

The EPS-side-ECU 200 comprises the torque control section 210 which calculates a motor current command value (a first motor current command value) Itref for the assist control, the steering angle control section 220 which calculates a motor current command value (a second motor current command value) Imref for the steering angle control, the switching section 230 which switches the operation mode, a current control/driving section 240 which drives and controls the motor 20, and a motor velocity calculating section 250 which calculates a motor velocity ωe. A steering torque Tt detected by a torque sensor 53 is inputted into the torque control section 210 and the steering angle control section 220.

The motor velocity calculating section 250 calculates the motor velocity ωe on the basis of the motor rotational angle θe from the rotational angle sensor 21. The motor velocity ωe is inputted into the steering angle control section 220.

Figure 1:
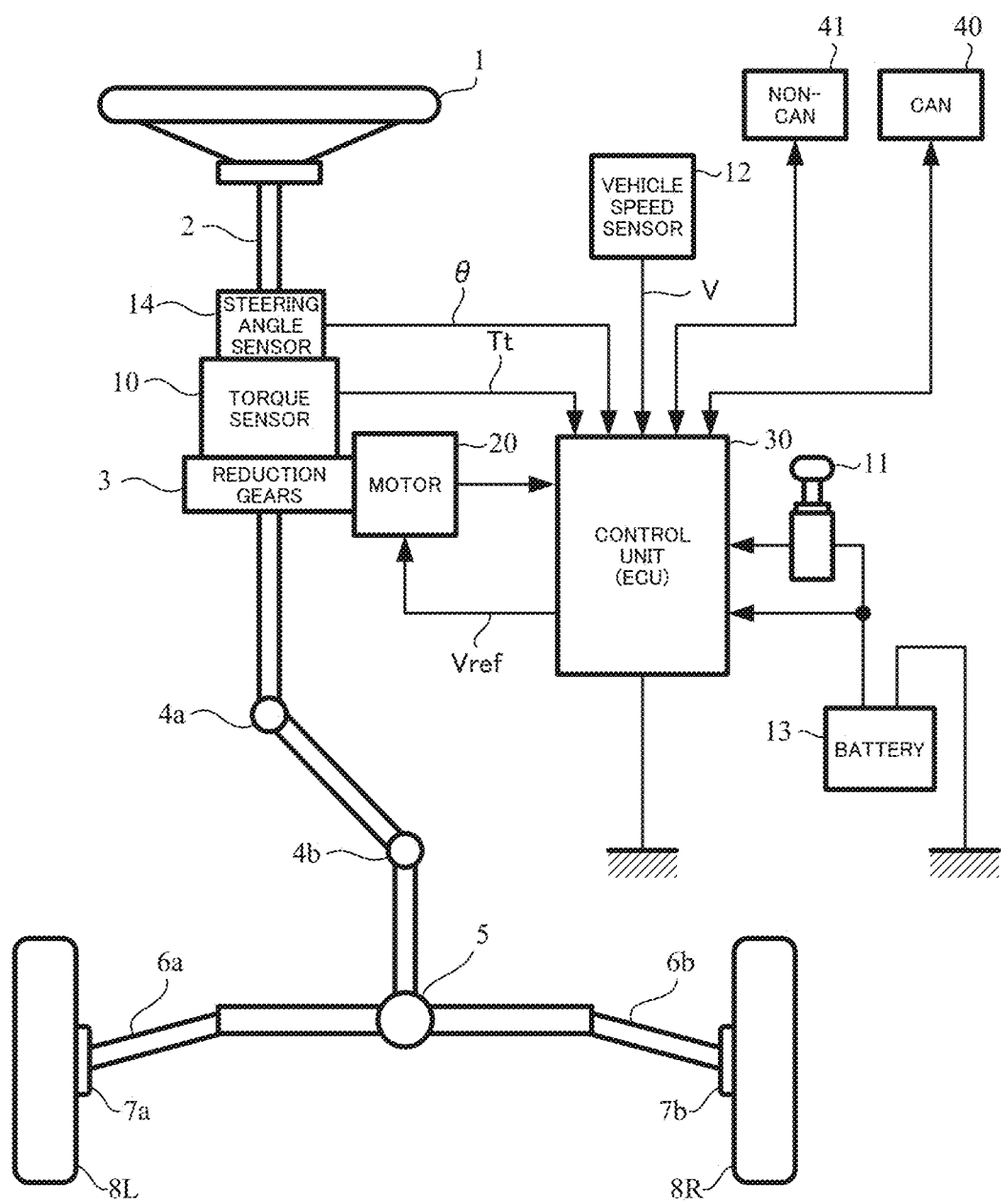
FIG. 1 is a configuration diagram illustrating a general outline of an electric power steering apparatus.
Figure 2:
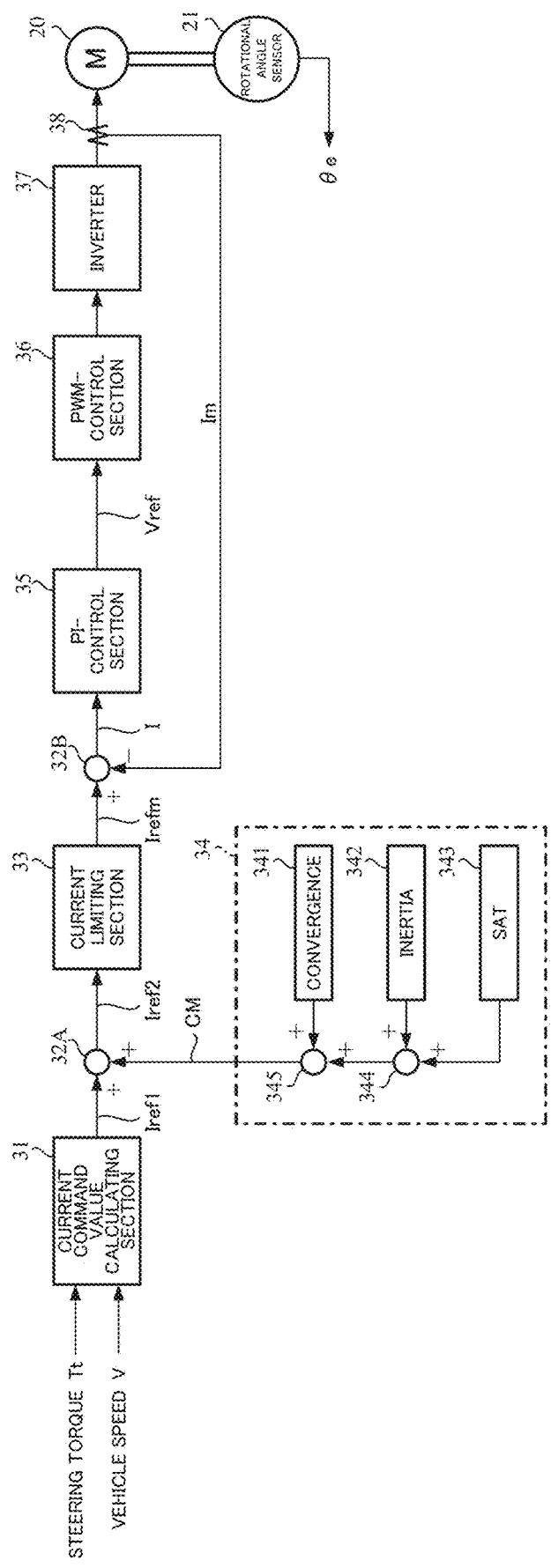
FIG. 2 is a block diagram showing a configuration example of a control unit (ECU) of the electric power steering apparatus.

The torque control section 210 comprises, for example, a current command value calculating section 31, a compensation signal generating section 34, an adding section 32A, and a current limiting section 33 in a configuration example shown in FIG. 2 in order to perform the assist control, and calculates the motor current command value Itref corresponding to a current command value Irefm shown in FIG. 2 by using an assist map on the basis of the steering torque Tt and the vehicle speed V. Moreover, the current limiting section 33 and/or the compensation signal generating section 34 may not be comprised.

The steering angle control section 220 calculates the motor current command value Imref on the basis of the target steering angle θref, the actual steering angle θr, the steering torque Tt and the motor velocity ωe in order to perform the steering angle control. A detail of the steering angle control section 220 will be described later.

The switching section 230 switches between the manual steering mode by the torque control section 210 and the automatic steering mode by the steering angle control section 220 on the basis of the switching command SW. The switching section 230 outputs the motor current command value Itref as the motor current command value Iref in the manual steering mode, and outputs the motor current command value Imref as the motor current command value Iref in the automatic steering mode.

The current control/driving section 240 comprises, for example, a subtracting section 32B, a PI-control section 35, a PWM-control section 36, and an inverter 37 in the configuration example shown in FIG. 2, and drives and controls the motor by using the motor current command value Iref and a motor current Im which is detected by a motor current detector 38 by an operation similar to the configuration example shown in FIG. 2.

The target steering angle generating section 120 and the steering angle control section 220 will be described in detail.

Figure 4:
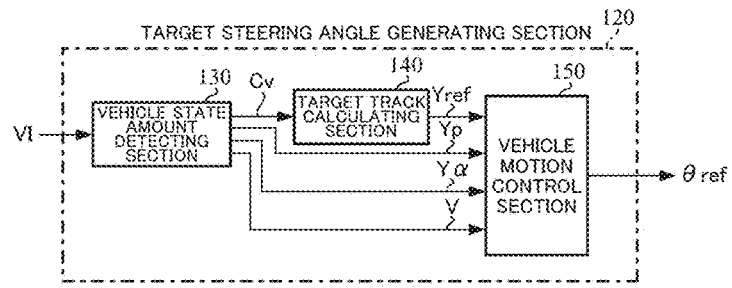
FIG. 4 is a block diagram showing a configuration example (the first embodiment) of a target steering angle generating section.

FIG. 4 shows a configuration example of the target steering angle generating section 120. The target steering angle generating section 120 comprises a vehicle state amount detecting section 130, a target track calculating section 140, and a vehicle motion control section 150.

The vehicle state amount detecting section 130 inputs data outputted from the camera, the GPS, an angular velocity sensor, an acceleration sensor and so on and the vehicle speed V from the vehicle speed sensor 51 as the vehicle information VI, obtains a lateral position Yp, a lateral acceleration Yα and a vehicle state amount Cv which is necessary data for calculation at the target track calculating section 140, and outputs them with the vehicle speedy. The lateral position Yp is calculated as a distance of own vehicle relative to a lane on the basis of image data of the camera or the like and position information of the GPS. The lateral position Yp, the lateral acceleration Yα and the vehicle speed V are inputted into the vehicle motion control section 150. The lateral position Yp, the lateral acceleration Yα and the vehicle speed V can be included in the vehicle state amount Cv.

The target track calculating section 140 calculates a lateral position command value Yref by an existing method on the basis of the vehicle state amount Cv, and outputs it to the vehicle motion control section 150.

Figure 5:
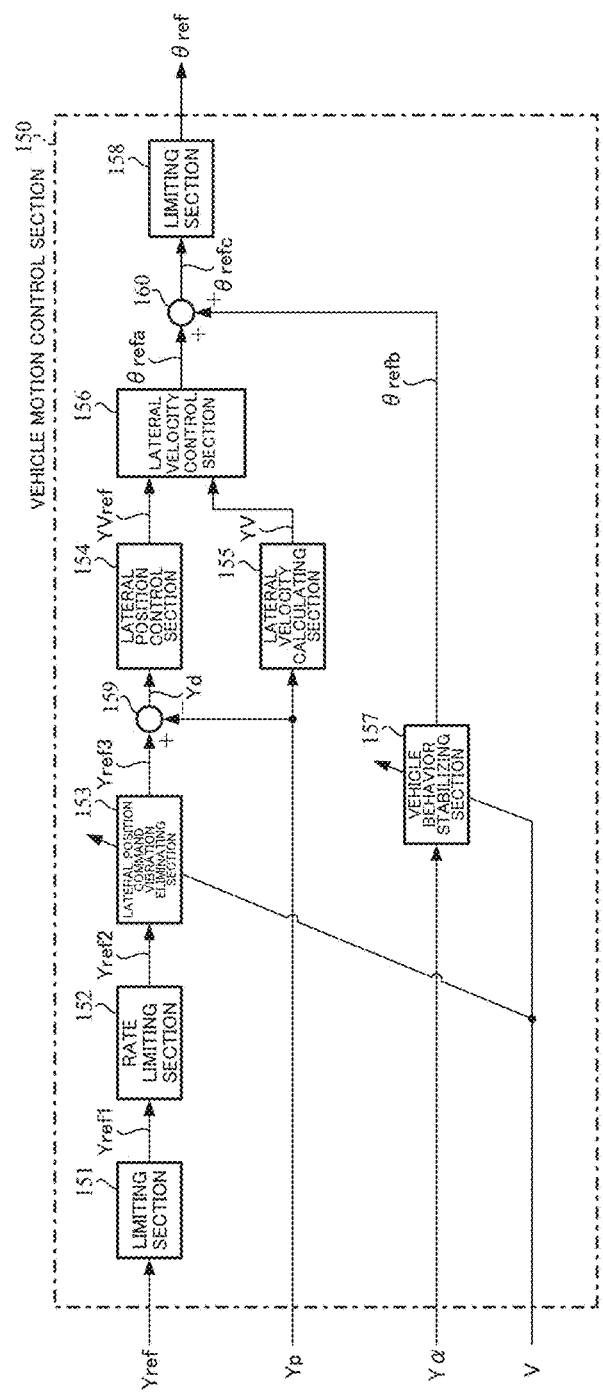
FIG. 5 is a block diagram showing a configuration example (the first embodiment) of a vehicle motion control section.

The vehicle motion control section 150 calculates the target steering angle θref on the basis of the lateral position command value Yref, the lateral position Yp, the lateral acceleration Yα and the vehicle speed V. FIG. 5 shows a configuration example of the vehicle motion control section 150. The vehicle motion control section 150 comprises a limiting section (a first limiting section) 151, a limiting section (a second limiting section) 158, a rate limiting section 152, a lateral position command vibration eliminating section 153, a lateral position control section 154, a lateral velocity calculating section 155, a lateral velocity control section 156, a vehicle behavior stabilizing section 157, a subtracting section 159, and an adding section 160.

The limiting section 151 limits the lateral position command value Yref by means of limit values (first limit values) consisting of a preset upper limit value and lower limit value, and outputs the limited value as a lateral position command value Yref1. This enables limitation when an abnormal value of the lateral position command value Yref occurs because of communication abnormality, memory abnormality, or the like. A magnitude (an absolute value) of the upper limit value and a magnitude of the lower limit value may be the same or be different.

Figure 6:
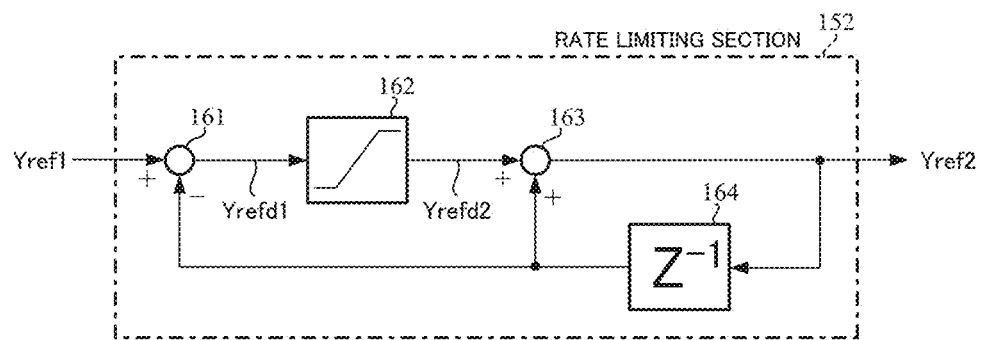
FIG. 6 is a block diagram showing a configuration example of a rate limiting section.
Figure 7:
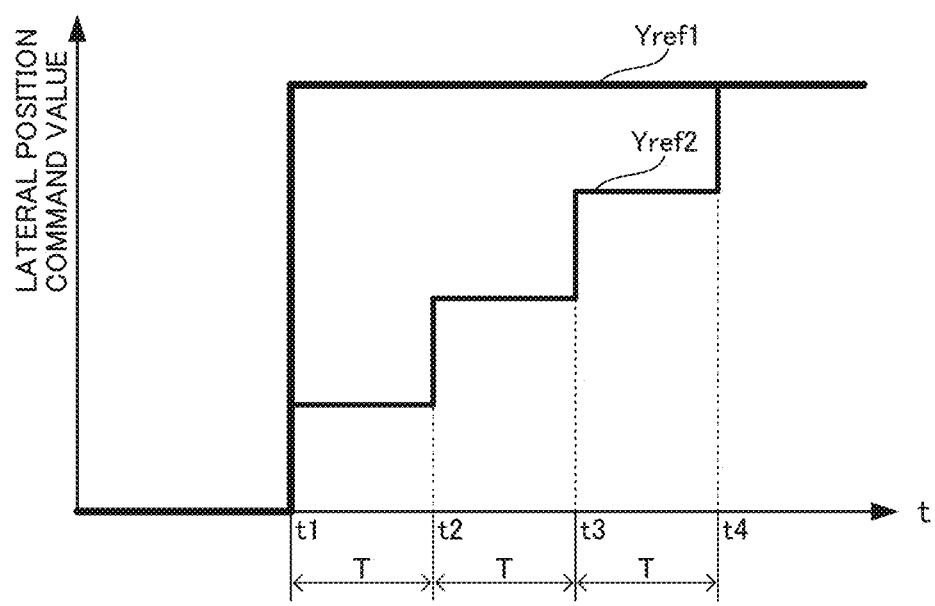
FIG. 7 is a graph showing an example of change of a lateral position command value by rate limitation.

In order to avoid a sudden change of the target steering angle caused by a rapid change of the lateral position command value, the rate limiting section 152 limits a variation of the lateral position command value Yref1 by setting a limit value (a rate limit value), and outputs a lateral position command value Yref2. This leads to improvement of safety of a driver. A configuration example of the rate limiting section 152 is shown in FIG. 6. A past value (data being one sample before) of the lateral position command value Yref2 is held in a holding section ($Z^{-1}$) 164, and a difference between the past value and the lateral position command value Yref1 which is addition-inputted into a subtracting section 161 is calculated as a variation Yrefd1. A variation setting section 162 limits the variation Yrefd1 by means of preset limit values (an upper limit value and a lower limit value), and outputs the limited value as a variation Yrefd2. That is, when the variation Yrefd1 is within a range between the upper limit value and the lower limit value, the variation setting section 162 outputs the variation Yrefd1 as the variation Yrefd2 as it is, and when the variation Yrefd1 is out of the range, the variation setting section 162 outputs the limit value as the variation Yrefd2. An adding section 163 adds the variation Yrefd2 to the past value of the lateral position command value Yref2 held in the holding section ($Z^{-1}$) 164, outputs the addition result as the lateral position command value Yref2, and the lateral position command value Yref2 is held in the holding section ($Z^{-1}$) 164. By such processing, for example, in the case that the lateral position command value Yref1 changes by a variation exceeding the limit value at the time point t1 as shown in FIG. 7, the variation Yrefd1 is limited by means of the limit value at the time point t1 and respective time points (t2 and t3) which are set in a calculation cycle T after the time point t1 until the time point t4 when the variation Yrefd1 does not exceed the limit value, so that the lateral position command value Yref2 changes stepwise as shown in FIG. 7, and matches the lateral position command value Yref1 after the time point t4. Therefore, even if the lateral position command value Yref1 changes rapidly, the rate limiting section 152 can reduce the change, so that it is possible to prevent a current from changing rapidly and reduce anxious feeling of automatic steering to a driver.

In order to reduce an influence of a vibration phenomenon caused by a resonance characteristic (a yaw resonance or the like) of a vehicle in vehicle control, the lateral position command vibration eliminating section 153 reduces a vibration frequency component included in the lateral position command value Yref2 by phase delay compensation or filter processing with such as a notch filter, and outputs a lateral position command value Yref3. As the filter, an arbitrary filter may be used if it decreases a gain in a band of the vibration frequency and is possible to mount on the ECU. Further, since a frequency and a gain of the yaw resonance of a vehicle generally change depending on a vehicle speed, the phase delay compensation and a frequency characteristic of the filter may be changed depending on the vehicle speed. Moreover, in such as a case where the vibration frequency component is minute, the lateral position command vibration eliminating section 153 may be removed.

The lateral position control section 154 calculates a lateral velocity command value YVref by P-control of multiplying a deviation Yd (=Yref3−Yp) between the lateral position command value Yref3 and the lateral position Yp by a proportional gain Kypp.

The lateral velocity calculating section 155 calculates a lateral velocity YV from the lateral position Yp. In order to calculate it, the lateral velocity calculating section 155 can perform a calculation equivalent to a differential, and, for example, uses a difference calculation, a low pass filter for eliminating a high frequency noise, and a gain. The lateral velocity calculating section 155 uses, for example, a primary filter as the low pass filter, and it is preferable to set a cutoff frequency between 10 Hz and 30 Hz.

The lateral velocity control section 156 calculates a target steering angle (a basic target steering angle) θrefa, by which the lateral velocity YV follows the lateral velocity command value YVref, by I-P control using the lateral velocity command value YVref and the lateral velocity YV.

Figure 8:
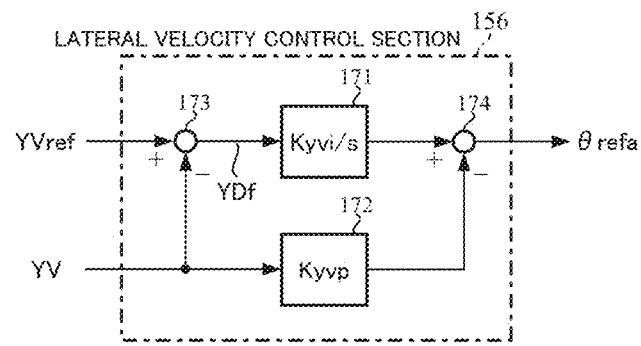
FIG. 8 is a block diagram showing a configuration example of a lateral velocity control section.

A configuration example of the lateral velocity control section 156 is shown in FIG. 8. A deviation YDf (=YVref−YV) between the lateral velocity command value YVref and the lateral velocity YV is calculated at a subtracting section 173. The deviation YDf is integrated and multiplied by a gain (Kyvi) at an integrating section 171, and the result is addition-inputted into a subtracting section 174. The lateral velocity YV is inputted also into a proportional section 172, is multiplies by a gain (Kyvp) at the proportional section 172, and the result is subtraction-inputted into the subtracting section 174. The subtraction result of the subtracting section 174 is outputted as the target steering angle θrefa.

Figure 9:
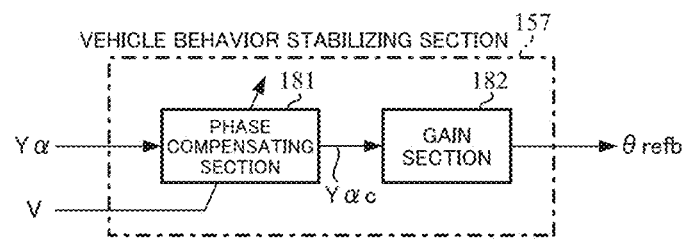
FIG. 9 is a block diagram showing a configuration example of a vehicle behavior stabilizing section.

The vehicle behavior stabilizing section 157 calculates a target steering angle (a compensatory target steering angle) θrefb for more improving the damping effect to vehicle vibration on the basis of the lateral acceleration Yα. The vehicle behavior stabilizing section 157, for example, comprises a phase compensating section 181 having a phase compensation filter and a gain section 182 as shown in FIG. 9. The lateral acceleration Yα is converted into a lateral acceleration Yαc by the phase compensation filter at the phase compensating section 181, the lateral acceleration Yαc is multiplied by a gain Kacc at the gain section 182, and the multiplication result is outputted as the target steering angle θrefb. The phase compensation filter may be a primary filter or a quadratic filter, and may be any one of a low pass filter, a high pass filter, a notch filter and a band pass filter if it has a phase characteristic which can be made stable. Further, it is possible to change a frequency characteristic of the phase compensation filter depending on the vehicle speed V so as to obtain more appropriate damping effect. For example, a gain map corresponding to the vehicle speed V is prepared, a cutoff frequency is changed depending on the vehicle speed V, and the phase compensation is performed. The arrangement of the phase compensating section 181 and the gain section 182 may be reversed.

The target steering angle θrefa from the lateral velocity control section 156 and the target steering angle θrefb from the vehicle behavior stabilizing section 157 are added at the adding section 160, and the addition result is outputted to the limiting section 158 as a target steering angle θrefc.

In order to prevent an excessive output, the limiting section 158 limits the target steering angle θrefc by means of limit values (second limit values) consisting of a preset upper limit value and lower limit value, and outputs the target steering angle θref.

Figure 10:
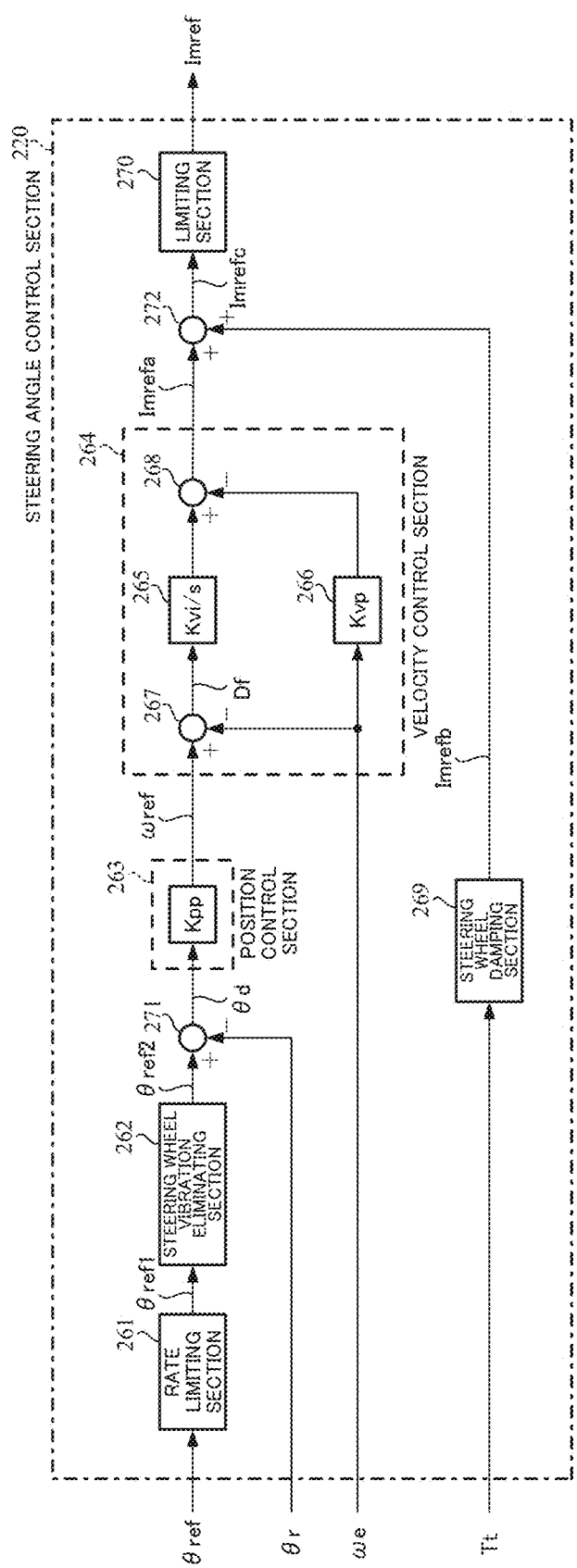
FIG. 10 is a block diagram showing a configuration example (the first embodiment) of a steering angle control section.

FIG. 10 shows a configuration example of the steering angle control section 220. The steering angle control section 220 comprises a rate limiting section 261, a steering wheel vibration eliminating section 262, a position control section 263, a velocity control section 264, a steering wheel damping section 269, a limiting section 270, a subtracting section 271, and an adding section 272.

In order to output the smoothed target steering angle θref when the target steering angle θref changes rapidly, the rate limit section 261 performs the rate limitation to the target steering angle θref by a configuration and an operation similar to the rate limiting section 152 in the vehicle motion control section 150, and outputs a target steering angle θref1. Because of the rate limitation of the rate limiting section 261, for example, even if the target steering angle θref changes as with the lateral position command value Yref1 shown in FIG. 7, the target steering angle θref1 changes stepwise as with the lateral position command value Yref2 shown in FIG. 7, and it is possible to reduce the rapid change.

In order to reduce an influence of vibration caused by springiness of a torsion bar and an inertia moment of a steering wheel in the automatic steering mode, the steering wheel vibration eliminating section 262 reduces a vibration frequency component included in the target steering angle θref1 by filter processing with a notch filter, and outputs a target steering angle θref2. A steering wheel vibration frequency by the springiness of a torsion bar and the inertia moment of a steering wheel (hereinafter this frequency is merely referred to a "steering wheel vibration frequency") is about 12.5 [Hz], and the steering wheel vibration eliminating section 262 uses the notch filter in order to decrease only the gain in the vicinity of the steering wheel vibration frequency, for example, 12.5±5.0 [Hz]. The steering wheel vibration eliminating section 262 uses, for example, a filter which has a quadric transfer function $G_{notch}$ expressed by the following expression 1.

$$G_{notch} = \frac{\omega_d^2}{\omega_n^2} \frac{s^2 + 2\zeta_n\omega_n s + \omega_n^2}{s^2 + 2\zeta_d\omega_d s + \omega_d^2} \quad [\text{Expression 1}]$$

Figure 11A:
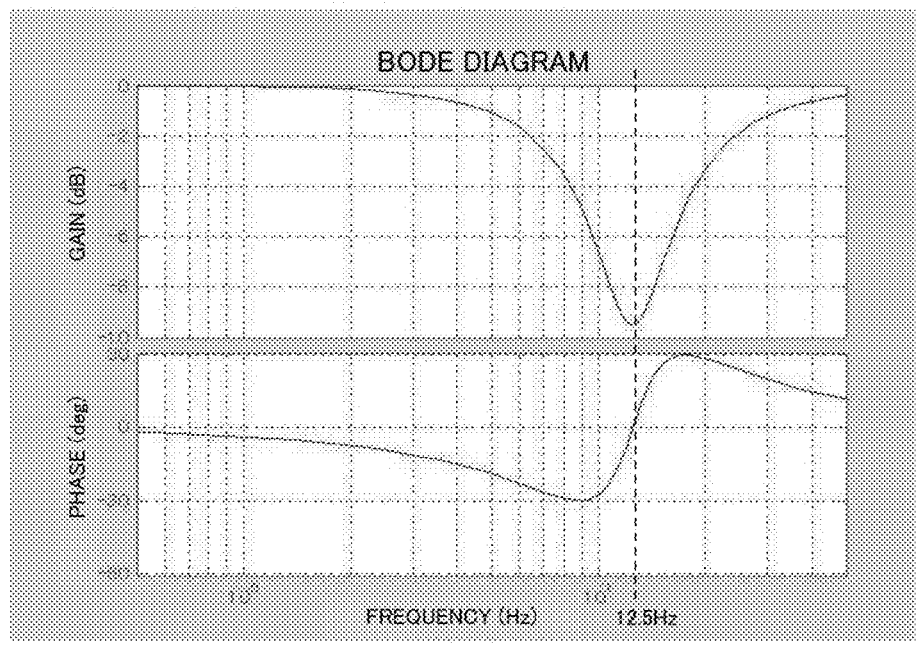

Here, ωn and ωd are center frequencies, ζn and ζd are damping constants, ands is a Laplace operator. A frequency characteristic of the transfer function $G_{notch}$ in the case of ωn=ωd=2π×12.5 [rad/s], and ζn=0.2 and ζd=0.6, is shown in FIGS. 11A and 11B. FIG. 11A shows a gain characteristic, and FIG. 11B shows a phase characteristic. From FIGS. 11A and 11B, it is found out that the gain is decreased at about 12.5 Hz. The center frequencies ωn and ωd are set on the basis of the steering wheel vibration frequency, and they are not necessary to coincide. Since they are set in the vicinity of the steering wheel vibration frequency, they may be set, for example, between 2π×7.5 and 290×17.5 [rad/s]. Further, it is possible to use a filter whose gain is decreased more loosely than a notch filter in accordance with a range and an amplitude of the vibration frequency component which should be reduced, and the steering wheel vibration eliminating section 262 may be removed in such as a case where the vibration frequency component is minute.

The position control section 263 calculates a motor velocity command value ωref by P-control of multiplying a deviation θd (=θref2−θr) between the target steering angle θref2 and the actual steering angle θr by a proportional gain Kpp.

The velocity control section 264 calculates a motor current command value Imrefa, by which the motor velocity ωe follows the motor velocity command value ωref, by I-P control using the motor velocity command value ωref and the motor velocity ωe. A deviation Df (=ωref−ωe) between the motor velocity command value ωref and the motor velocity ωe is calculated at a subtracting section 267. The deviation Df is integrated and multiplied by a gain (Kvi) at an integrating section 265, and the result is addition-inputted into a subtracting section 268. The motor velocity ωe is inputted also into a proportional section 266, is multiplies by a gain (Kvp) at the proportional section 266, and the result is subtraction-inputted into the subtracting section 268. The subtraction result of the subtracting section 268 is outputted as the motor current command value Imrefa. It is possible to use an actual steering angular velocity instead of the motor velocity ωe, and the actual steering angular velocity may be calculated by using the actual steering angle θr.

Figure 12A:
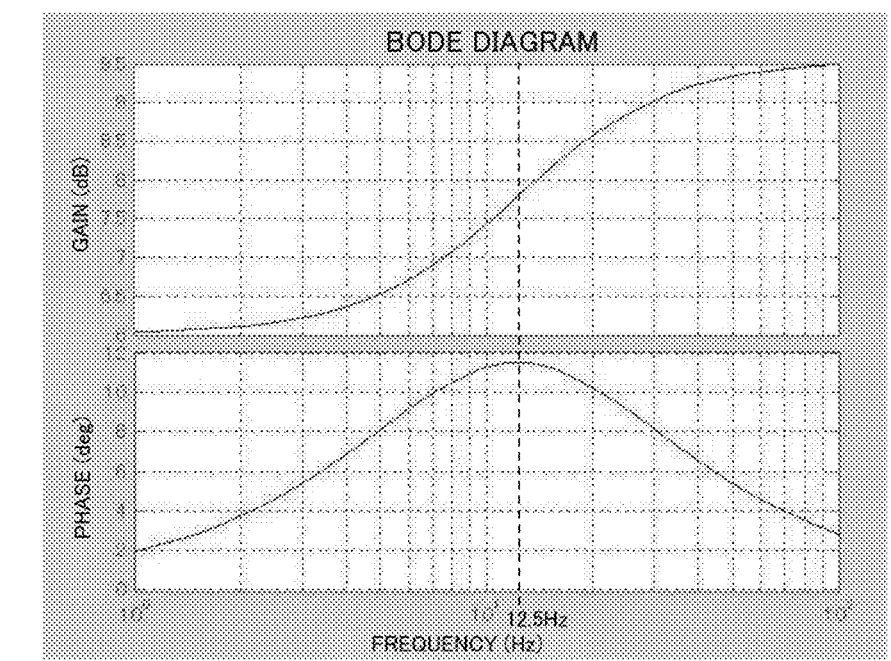

The steering wheel damping section 269 calculates a motor current command value Imrefb for more improving the damping effect to steering wheel vibration on the basis of the steering torque Tt. The steering wheel damping section 269 calculates the motor current command value Imrefb by phase compensation and multiplication of a gain as with the vehicle behavior stabilizing section 157 in the vehicle motion control section 150. A filter for the phase compensation may be a primary filter or a quadratic filter, and may be a low pass filter, a high pass filter or the like if it has a phase characteristic which can be made stable. For example, an example of a frequency characteristic in the case of using a primary high pass filter is shown in FIGS. 12A and 12B. FIG. 12A shows a gain characteristic, and FIG. 12B shows a phase characteristic. Since a cutoff frequency is set on the basis of the steering wheel vibration frequency, it is set to 12.5 Hz in FIGS. 12A and 12B. The steering wheel damping section 269 may be removed in such as a case where the vibration frequency component which should be reduced is minute.

The motor current command value Imrefa from the velocity control section 264 and the motor current command value Imrefb from the steering wheel damping section 269 are added at the adding section 272, and the addition result is outputted as a motor current command value Imrefc to the limiting section 270.

In order to prevent an excessive output, the limiting section 270 limits the motor current command value Imrefc by means of limit values consisting of a preset upper limit value and lower limit value, and outputs the motor current command value Imref.

Figure 13:
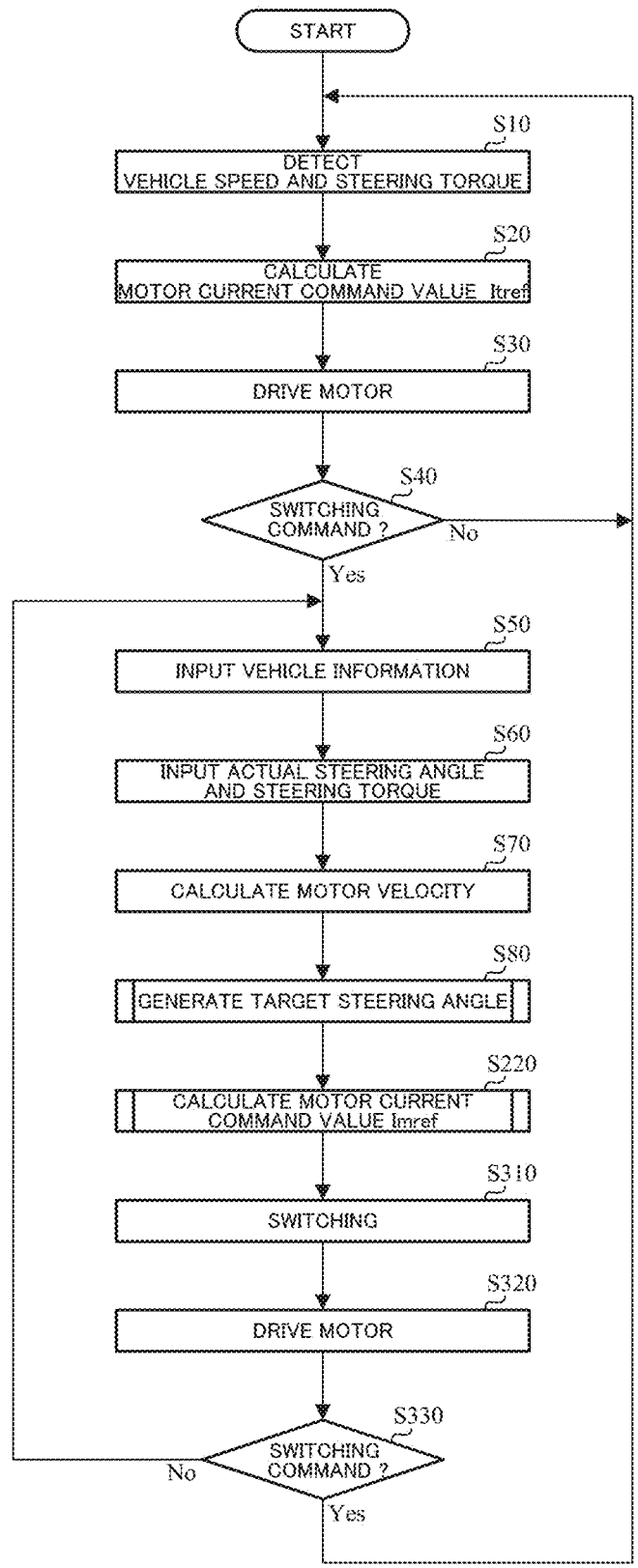
FIG. 13 is a flowchart showing a whole operating example of the present invention.
Figure 14:
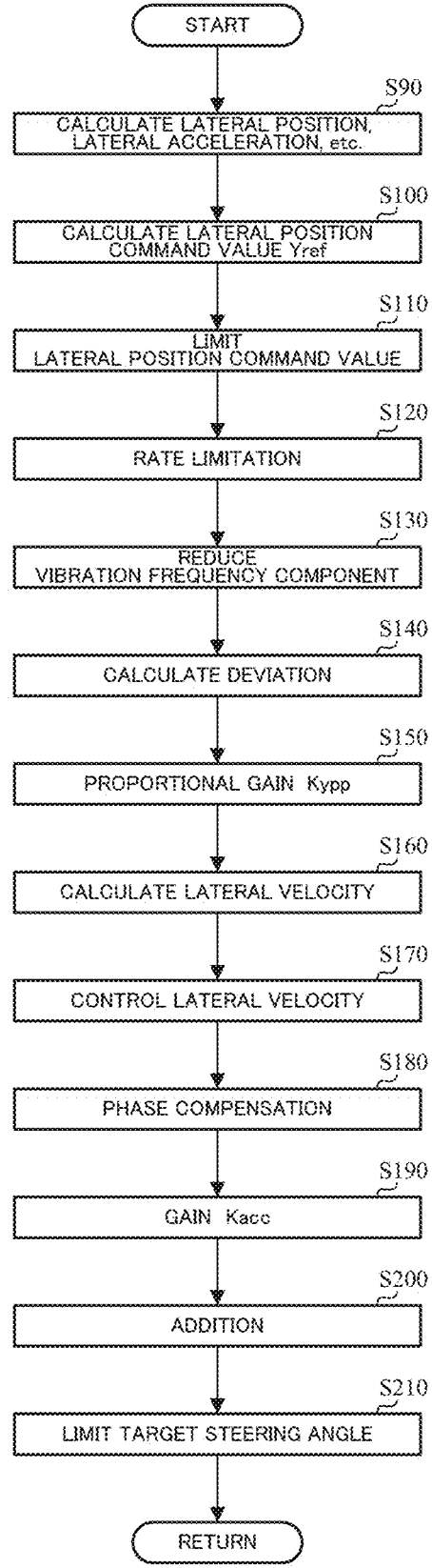
FIG. 14 is a flowchart showing an operating example (the first embodiment) of the target steering angle generating section.
Figure 15:
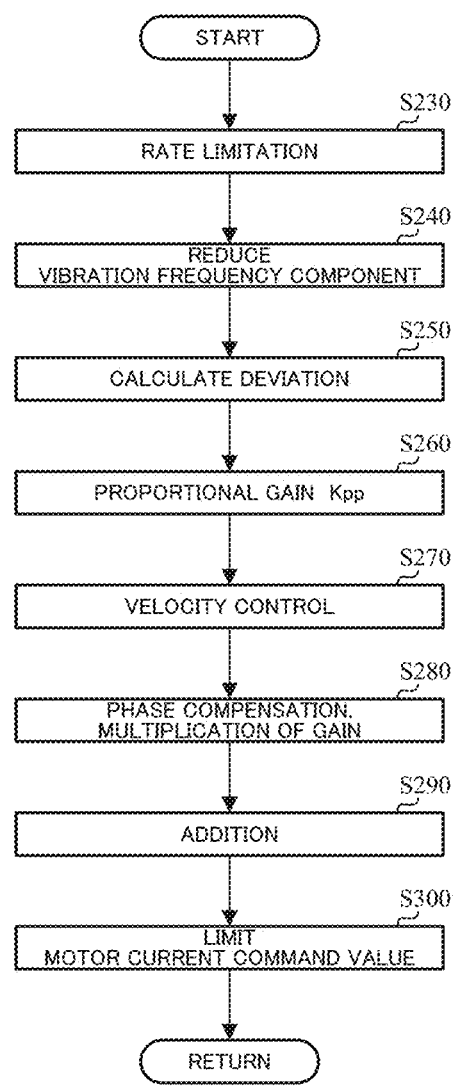
FIG. 15 is a flowchart showing an operating example (the first embodiment) of the steering angle control section.

In such a configuration, the operating example will be described with reference to flowcharts shown in FIGS. 13 to 15. The operation mode of the EPS at the start of the operation is set to the "manual steering mode".

When an operation of the steering system starts, the vehicle speed sensor 51 and the torque sensor 53 detect the vehicle speed V and the steering torque Tt respectively (Step S10). The torque control section 210 in the EPS-side-ECU 200 inputs the vehicle speed V and the steering torque Tt, and calculates the motor current command value Itref for the assist control with the operations similar to the current command value calculating section 31, the compensation signal generating section 34, the adding section 32A and the current limiting section 33 shown in FIG. 2 (Step S20). The motor current command value Itref is inputted into the current control/driving section 240 as the motor current command value Iref through the switching section 230, and the current control/driving section 240 drives the motor 20 by using the motor current command value Iref (Step S30). The operations of the steps S10 to S30 are repeated until the switching command SW is outputted from the switching command section 110 in the vehicle-side-ECU 100 (Step S40).

When the operation mode is changed to the "automatic steering mode" and the switching command SW is outputted from the switching command section 110 (Step S40), the vehicle speed V which the vehicle speed sensor 51 detects is inputted into the target steering angle generating section 120 as the vehicle information VI with the signals from the camera and so on (Step S50). Further, the actual steering angle θr and the steering torque Tt which the steering angle sensor 52 and the torque sensor 53 have detected respectively, are inputted into the steering angle control section 220 (Step S60). Furthermore, the motor velocity calculating section 250 calculates the motor velocity ωe by the motor rotational angle θe from the rotational angle sensor 21, and outputs it to the steering angle control section 220 (Step S70).

The target steering angle generating section 120 which has inputted the vehicle information VI generates the target steering angle θref on the basis of the vehicle information VI, and outputs it to the steering angle control section 220 (Step S80). A detailed operation of the target steering angle generating section 120 will be described later. The order of the operation of the motor velocity calculating section 250 and the operation of the target steering angle generating section 120 may be reversed, or the operations may be performed in parallel.

The steering angle control section 220 inputs the actual steering angle θr, the steering torque Tt, the motor velocity ωe and the target steering angle θref, and calculates the motor current command value Imref for the steering angle control on the basis of them (Step S220). A detailed operation of the steering angle control section 220 will be described later.

After that, the switching section 230 is switched in accordance with the switching command SW (Step S310), the motor current command value Imref from the steering angle control section 220 is inputted into the current control/driving section 240 as the motor current command value Iref, and the current control/driving section 240 drives the motor 20 by using the motor current command value Iref (Step S320). The operations of the steps S50 to S320 are repeated until the switching command SW from the switching command section 110 is changed (Step S330). When the switching command SW is changed, the operation is returned to the step S10.

The detail of the operating example of the target steering angle generating section 120 will be described with reference to a flowchart shown in FIG. 14.

The vehicle information VI is inputted into the vehicle state amount detecting section 130. The vehicle state amount detecting section 130 obtains the lateral position Yp, the lateral acceleration Yα and the vehicle state amount Cv (Step S90), the vehicle state amount Cv is inputted into the target track calculating section 140, and the lateral position Yp and the lateral acceleration Yα are inputted into the vehicle motion control section 150 with the vehicle speed V.

The target track calculating section 140 calculates the lateral position command value Yref on the basis of the vehicle state amount Cv (Step S100). The lateral position command value Yref is inputted into the vehicle motion control section 150.

In the vehicle motion control section 150, the lateral position command value Yref is inputted into the limiting section 151, the lateral position Yp is inputted into the subtracting section 159 and the lateral velocity calculating section 155, the lateral acceleration Yα is inputted into the vehicle behavior stabilizing section 157, and the vehicle speed V is inputted into the lateral position command vibration eliminating section 153 and the vehicle behavior stabilizing section 157.

The limiting section 151 limits the lateral position command value Yref by using the preset upper limit value and lower limit value, and outputs the limited value as the lateral position command value Yref1 to the rate limiting section 152 (Step S110). That is, in the case that the lateral position command value Yref is within the range between the upper limit value and the lower limit value, the limiting section 151 outputs the lateral position command value Yref as the lateral position command value Yref1 as it is, and in the case that the lateral position command value Yref is out of the range, the limiting section 151 outputs the upper limit value or the lower limit value as the lateral position command value Yref1 according to the limit value which has been exceeded.

The rate limiting section 152 performs the rate limitation as described above (Step S120), and outputs the lateral position command value Yref2 to the lateral position command vibration eliminating section 153.

The lateral position command vibration eliminating section 153 calculates the lateral position command value Yref3 obtained by reducing the vibration frequency component included in the lateral position command value Yref2 on the basis of the frequency characteristic which has been set depending on the inputted vehicle speed V (Step S130). The lateral position command value Yref3 is addition-inputted into the subtracting section 159.

The deviation Yd is calculated by subtracting the subtraction-inputted lateral position Yp from the lateral position command value Yref3 (Step S140), and is inputted into the lateral position control section 154.

The lateral position control section 154 calculates the lateral velocity command value YVref by multiplying the deviation Yd by the proportional gain Kypp (Step S150). The lateral velocity command value YVref is inputted into the lateral velocity control section 156.

The lateral velocity calculating section 155 which has inputted the lateral position Yp calculates the lateral velocity YV from the lateral position Yp (Step S160), and outputs it to the lateral velocity control section 156.

The lateral velocity control section 156 calculates the target steering angle θrefa in accordance with the I-P control by using the lateral velocity command value YVref and the lateral velocity YV (Step S170), and outputs it to the adding section 160.

In the vehicle behavior stabilizing section 157 which has inputted the lateral acceleration Yα and the vehicle speed V, the phase compensating section 181 converts the lateral acceleration Yα into the lateral acceleration Yαc by using the phase compensation filter which has been set depending on the inputted vehicle speed V (Step S180), the lateral acceleration Yαc is multiplied by the gain Kacc at the gain section 182 (Step S190), and the multiplication result is outputted as the target steering angle θrefb to the adding section 160.

The target steering angle θrefa and the target steering angle θrefb are added at the adding section 160 (Step S200), and the target steering angle θrefc of the addition result is inputted into the limiting section 158.

The limiting section 158 limits the target steering angle θrefc with the operation similar to the limiting section 151 by using the preset upper limit value and lower limit value, and outputs the limited value as the target steering angle θref (Step S210).

The order of the operation to the calculation of the lateral velocity command value YVref and the operation of the lateral velocity calculating section 155, and the order of the operation to the calculation of the target steering angle θrefa and the operation of the vehicle behavior stabilizing section 157, may be reversed respectively, or the operations in each pair may be performed in parallel.

The detail of the operating example of the steering angle control section 220 will be described with reference to a flowchart shown in FIG. 15.

In the steering angle control section 220, the target steering angle θref is inputted into the rate limiting section 261, the actual steering angle θr is inputted into the subtracting section 271, the motor velocity ωe is inputted into the velocity control section 264, and the steering torque Tt is inputted into the steering wheel damping section 269.

The rate limiting section 261 performs the rate limitation to the target steering angle θref with the operation similar to the rate limiting section 152 in the vehicle motion control section 150 (Step S230), and outputs the target steering angle θref1 to the steering wheel vibration eliminating section 262.

The steering wheel vibration eliminating section 262 calculates the target steering angle θref2 by reducing the vibration frequency component included in the target steering angle θref1 by using the notch filter having the transfer function $G_{notch}$ expressed by the expression 1 (Step S240). The target steering angle θref2 is addition-inputted into the subtracting section 271.

The deviation θd is calculated at the subtracting section 271 by subtracting the subtraction-inputted actual steering angle θr from the target steering angle θref2 (Step S250). The deviation θd is inputted into the position control section 263.

The position control section 263 calculates the motor velocity command value ωref by multiplying the deviation θd by the proportional gain Kpp (Step S260). The motor velocity command value ωref is inputted into the velocity control section 264.

The velocity control section 264 which has inputted the motor velocity ωe and the motor velocity command value ωref, calculates the motor current command value Imrefa in accordance with the I-P control by using them (Step S270), and outputs it to the adding section 272.

The steering wheel damping section 269 which has inputted the steering torque Tt calculates the motor current command value Imrefb on the basis of the steering torque Tt by the phase compensation and the multiplication of the gain (Step S280). The motor current command value Imrefb is inputted into the adding section 272.

The motor current command value Imrefa and the motor current command value Imrefb are added at the adding section 272 (Step S290), and the motor current command value Imrefc of the addition result is inputted into the limiting section 270.

The limiting section 270 limits the motor current command value Imrefc with the operation similar to the limiting sections 151 and 158 in the vehicle motion control section 150 by using the preset upper limit value and lower limit value, and outputs the limited value as the motor current command value Imref (Step S300).

The order of the operation to the calculation of the motor current command value Imrefa and the operation of the steering wheel damping section 269 may be reversed, or the operations may be performed in parallel.

Results of simulations with and without the vehicle behavior stabilizing section 157 will be described as an effect of the present embodiment.

The simulations use a primary phase compensation filter where a cutoff frequency of a numerator is 1 Hz and a cutoff frequency of a denominator is 0.2 Hz as the phase compensation filter which the phase compensating section 181 in the vehicle behavior stabilizing section 157 has, set the gain Kacc of the gain section 182 so as to make the target steering angle equivalent to 50 deg to the lateral acceleration of 1 m/s$^2$, and are performed in the case of providing the vehicle behavior stabilizing section 157 and in the case of not providing it. The results are shown in FIGS. 16 and 17.

Figure 16:
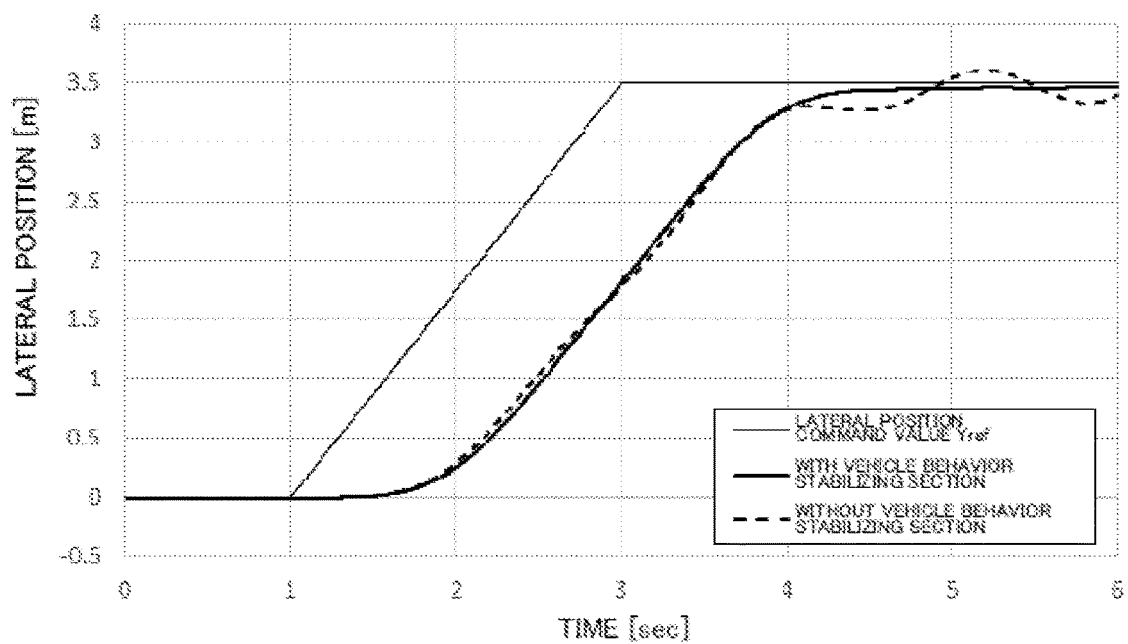

FIG. 16 sets the horizontal axis to a time [sec], sets the vertical axis to a lateral position [m] of a vehicle, and shows time responses of the lateral position Yp in the case of changing the lateral position command value Yref as shown by the thin solid line with the vehicle behavior stabilizing section 157 (the thick solid line) and without it (the broken line). As found out from FIG. 16, the lateral position Yp is stable without vibration in the case of providing the vehicle behavior stabilizing section 157, on the other hand, it is not stable with vibration in the case of not providing the vehicle behavior stabilizing section 157.

Figure 17:
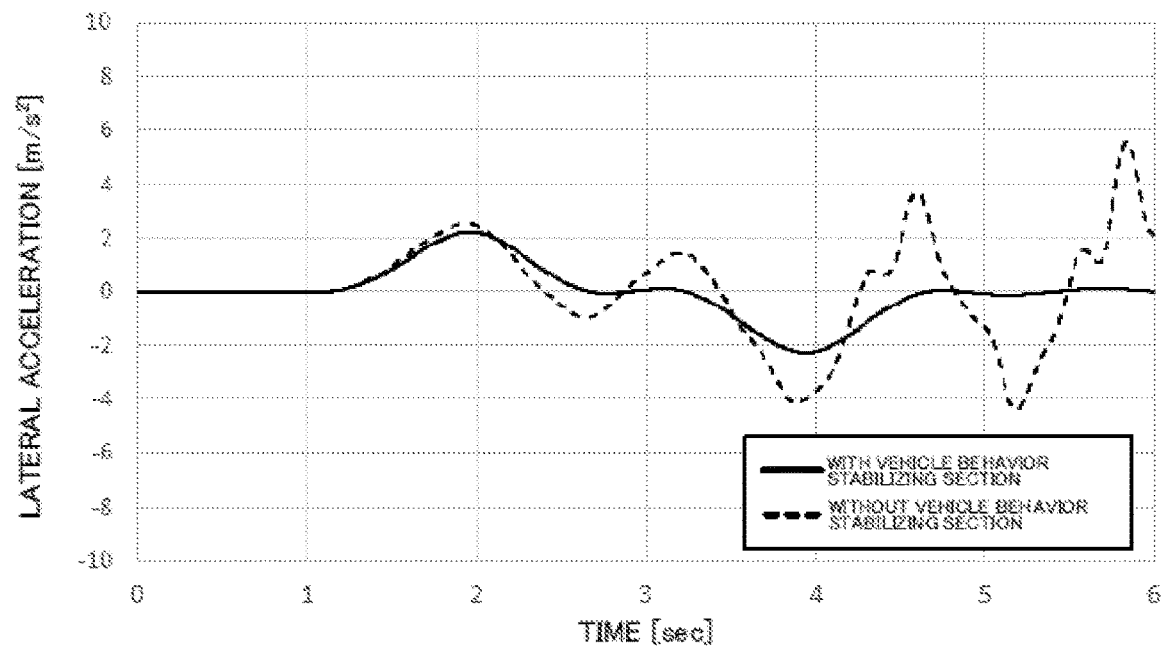

Time responses of the lateral acceleration Yα in the same simulations are shown in FIG. 17. FIG. 17 sets the horizontal axis to a time [sec], sets the vertical axis to a lateral acceleration [m/s$^2$], and shows the lateral acceleration Yα in the case of providing the vehicle behavior stabilizing section 157 by the thick solid line and the lateral acceleration Yα in the case of not providing it by the broken line as with FIG. 16. From FIG. 17, it is found out that the lateral acceleration Yα is hard to vibrate in the case of providing the vehicle behavior stabilizing section 157.

Other embodiments of the present invention will be described.

Figure 18:
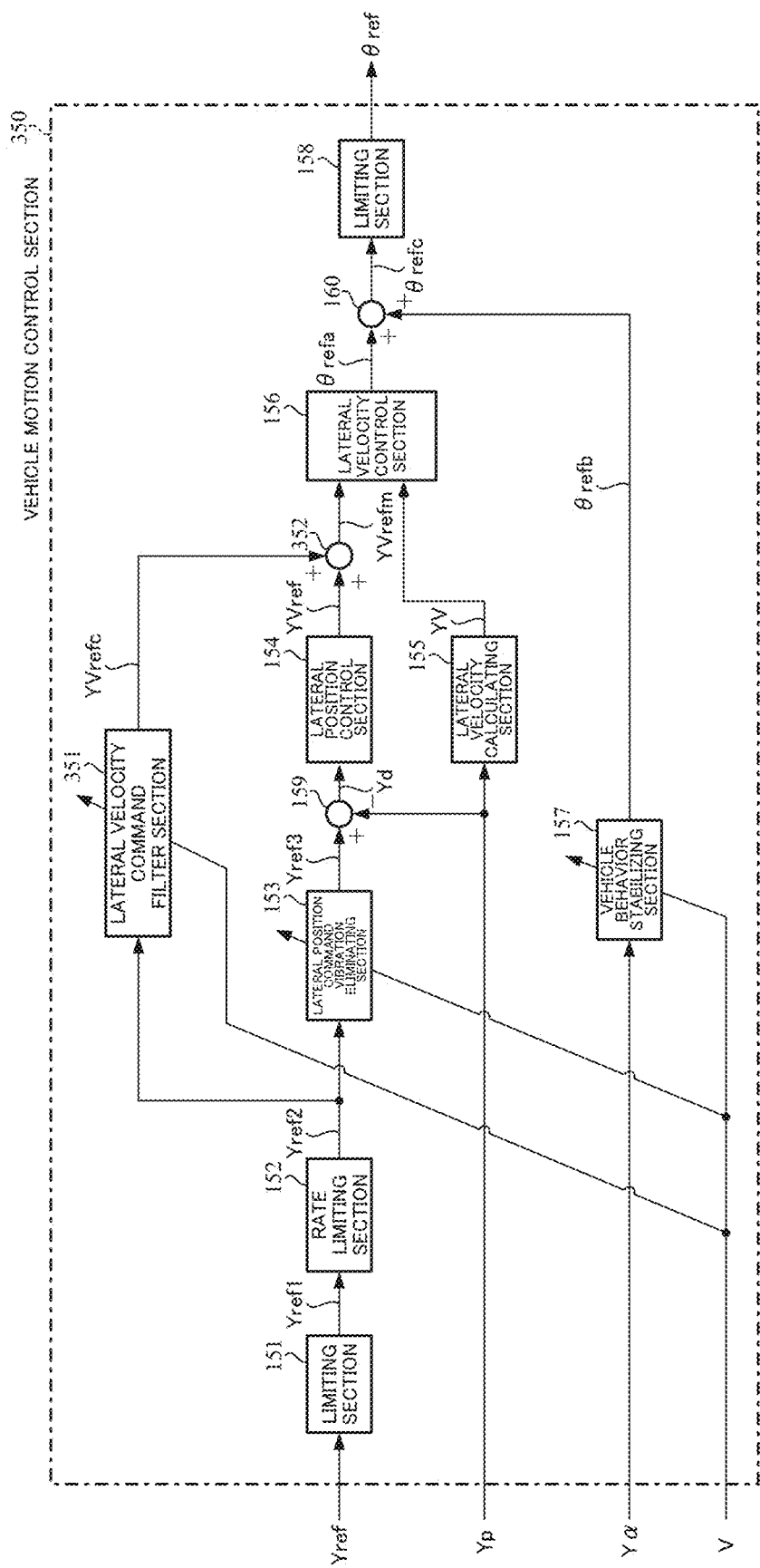
FIG. 18 is a block diagram showing a configuration example (a second embodiment) of a vehicle motion control section.

FIG. 18 shows another configuration example (a second embodiment) of the vehicle motion control section in the target steering angle generating section. Compared with the vehicle motion control section 150 of the first embodiment shown in FIG. 5, a lateral velocity command filter section 351 and an adding section 352 are added in a vehicle motion control section 350 of the second embodiment. Other configurations are the same as those of the first embodiment, so that the explanation is omitted.

The lateral velocity command filter section 351 has a feedforward (FF) filter, and converts the lateral position command value Yref2 obtained by performing the rate limitation at the rate limiting section 152 into a lateral velocity command value (a compensation value) YVrefc by means of the FF filter. The converted lateral velocity command value YVrefc is added to the lateral velocity command value YVref outputted from the lateral position control section 154 at the adding section 352, and the addition result is outputted as the lateral velocity command value YVrefm to the lateral velocity control section 156. This enables improvement of followability of the lateral position to the lateral position command value. A phase advance filter, a high pass filter, a filter corresponding to a differential, or the like is used as the FF filter so as to advance a phase of the lateral position command value Yref2. Further, it is possible to change a characteristic of the FF filter depending on the vehicle speed V in order to more improve the followability.

Figure 19:
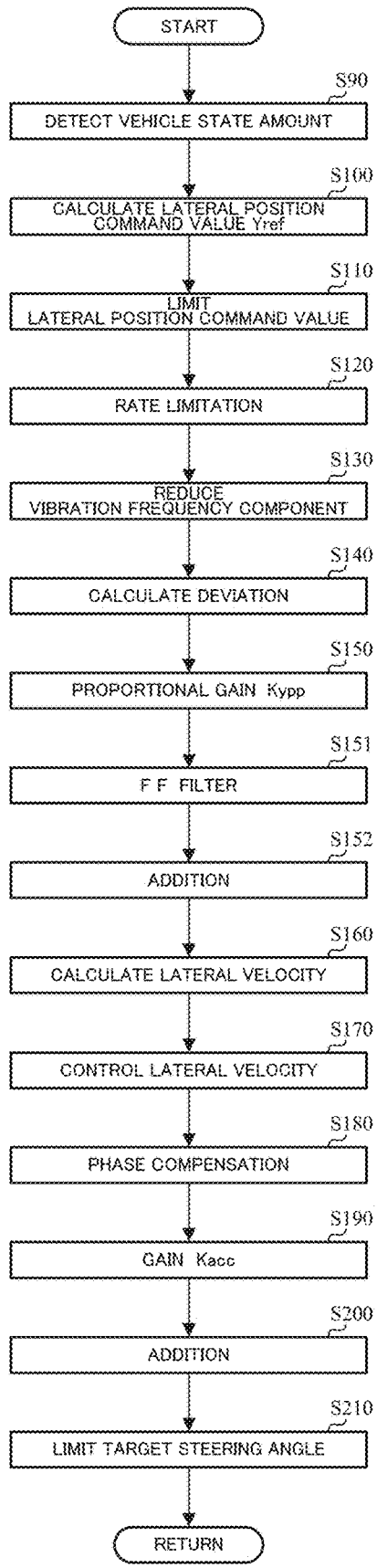
FIG. 19 is a block diagram showing a configuration example (the second embodiment) of a target steering angle generating section.

An operating example of the target steering angle generating section in the second embodiment is shown in FIG. 19. Compared with the operating example of that in the first embodiment shown in FIG. 14, operations of the lateral velocity command filter section 351 and the adding section 352 are added (Steps S151 and S152). The lateral position command value Yref2 outputted from the rate limiting section 152 is inputted into the lateral velocity command filter section 351 in addition to the lateral position command vibration eliminating section 153 with the vehicle speed V. The lateral velocity command filter section 351 converts the lateral position command value Yref2 into the lateral velocity command value YVrefc by using the FF filter whose characteristic has been set depending on the vehicle speed V (Step S151), and outputs the lateral velocity command value YVrefc to the adding section 352. The lateral velocity command value YVref outputted from the lateral position control section 154 is inputted into the adding section 352 instead of the lateral velocity control section 156. The lateral velocity command value YVrefc and the lateral velocity command value YVref are added at the adding section 352 (Step S152). The addition result is inputted into the lateral velocity control section 156 as the lateral velocity command value YVrefm. The order of the operation of the lateral velocity command filter section 351, the operation from the lateral position command vibration eliminating section 153 to the lateral position control section 154, and the operation of the lateral velocity calculating section 155 may be changed, or the operations may be performed in parallel.

The configuration component (the lateral velocity command filter section 351) having the FF filter is added to the vehicle motion control section in the second embodiment, while it is also possible to add a configuration component having the FF filter to the steering angle control section.

Figure 20:
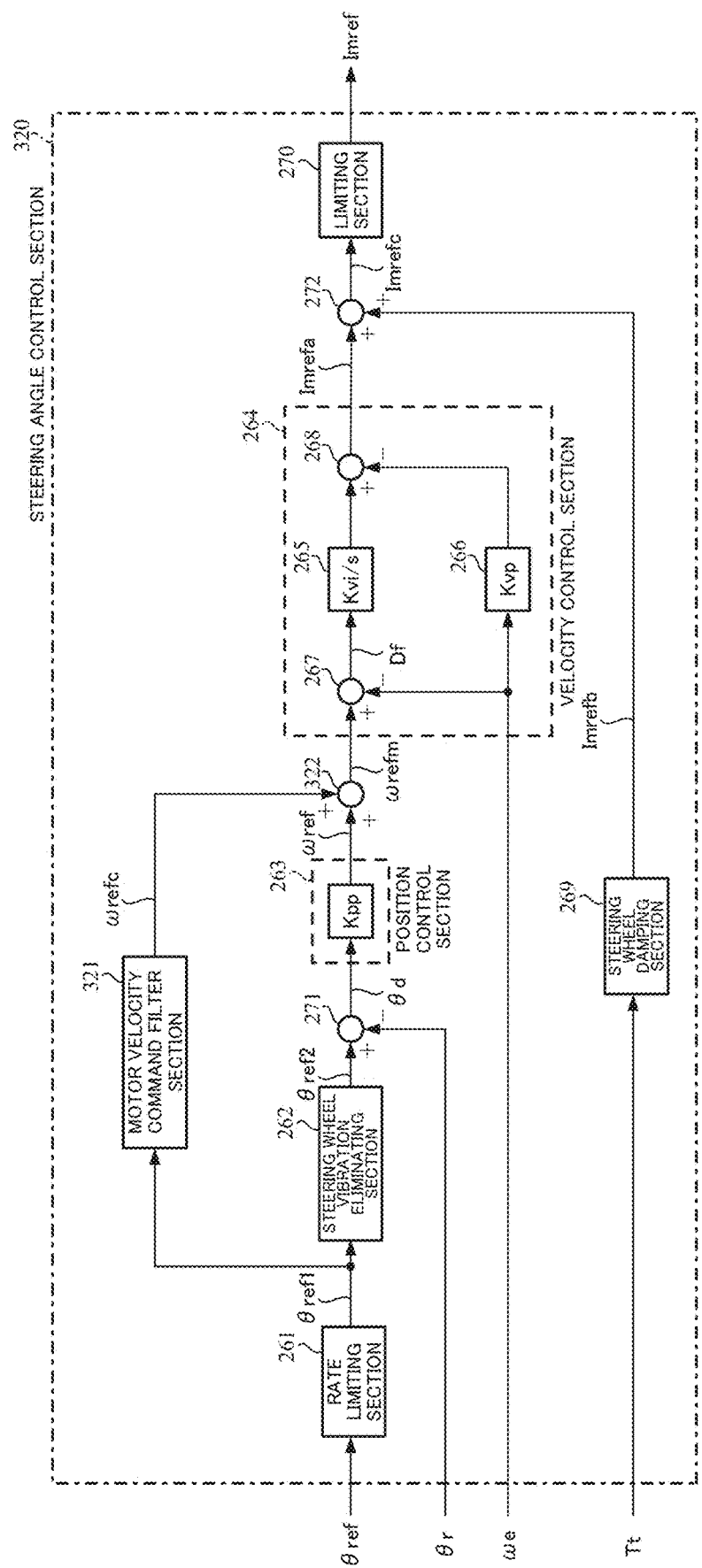
FIG. 20 is a block diagram showing a configuration example (a third embodiment) of a steering angle control section.

FIG. 20 shows a configuration example (a third embodiment) where the configuration component having the FF filter is added to the steering angle control section. Compared with the steering angle control section 220 in the first embodiment shown in FIG. 10, a motor velocity command filter section 321 and an adding section 322 are added to a steering angle control section 320 in the third embodiment. Other configurations are the same as those of the first embodiment, so that the explanation is omitted.

The motor velocity command filter section 321 converts the target steering angle θref1 obtained by performing the rate limitation at the rate limiting section 261 into a motor velocity command value ωrefc by means of the FF filter. The converted motor velocity command value ωrefc is added to the motor velocity command value ωref outputted from the position control section 263 at the adding section 322, and the addition result is outputted as a motor velocity command value ωrefm to the velocity control section 264. Thereby, it is possible to extend a control band of the actual steering angle for the target steering angle to a high frequency side, and as a result, it is possible to improve responsiveness of the steering angle control.

Figure 21:
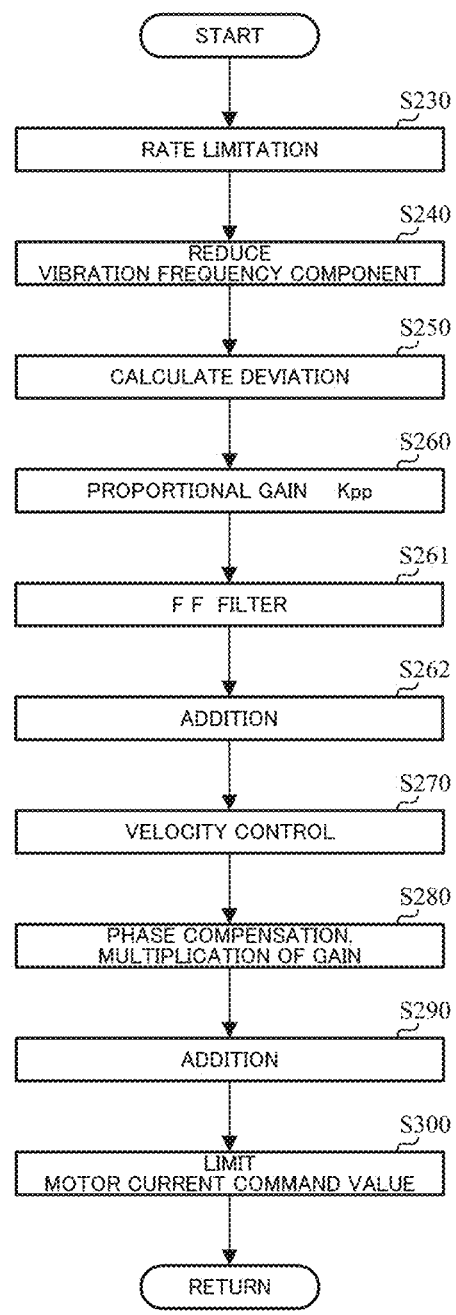
FIG. 21 is a flowchart showing an operating example (the third embodiment) of the steering angle control section.

An operating example of the steering angle control section 320 in the third embodiment is shown in FIG. 21. Compared with the operating example of that in the first embodiment shown in FIG. 15, operations of the motor velocity command filter section 321 and the adding section 322 are added (Steps S261 and S262). The target steering angle θref1 outputted from the rate limiting section 261 is inputted into the motor velocity command filter section 321 in addition to the steering wheel vibration eliminating section 262. The motor velocity command filter section 321 converts the target steering angle θref1 into the motor velocity command value ωrefc by using the FF filter (Step S261), and outputs the motor velocity command value ωrefc to the adding section 322. The motor velocity command value ωref outputted from the position control section 263 is inputted into the adding section 322 instead of the velocity control section 264. The motor velocity command value ωrefc and the motor velocity command value ωref are added at the adding section 322 (Step S262). The addition result is inputted as the motor velocity command value ωrefm into the velocity control section 264. The order of the operation of the motor velocity command filter section 321 and the operation from the steering wheel vibration eliminating section 262 to the position control section 263 may be reversed, or the operations may be performed in parallel.

Though the switching section 230 switches the motor current command value on the basis of the switching command SW from the switching command section 110 in the above embodiments (the first to the third embodiments), it is possible to gradually perform this switching. Thereby, it is possible to reduce discontinuity of the motor current command value in switching the operation mode.

Further, the limiting sections 151, 158 and 270, and the rate limiting sections 152 and 261 may be removed in such a case where a cost is more important than an effect of each section.

EXPLANATION OF REFERENCE NUMERALS 1 steering wheel
2 column shaft (steering shaft, handle shaft)
10, 53 torque sensor
12, 51 vehicle speed sensor
13 battery
14, 52 steering angle sensor
20 motor
21 rotational angle sensor
30 control unit (ECU)
31 current command value calculating section
33 current limiting section
34 compensation signal generating section
35 PI-control section
36 PWM-control section
37 inverter
38 motor current detector
100 vehicle-side-ECU
110 switching command section
120 target steering angle generating section
130 vehicle state amount detecting section
140 target track calculating section
150, 350 vehicle motion control section
151, 158, 270 limiting section
152, 261 rate limiting section
153 lateral position command vibration eliminating section
154 lateral position control section
155 lateral velocity calculating section
156 lateral velocity control section
157 vehicle behavior stabilizing section
181 phase compensating section
182 gain section
200 EPS-side-ECU
210 torque control section
220, 320 steering angle control section
230 switching section
240 current control/driving section
250 motor velocity calculating section
262 steering wheel vibration eliminating section
263 position control section
264 velocity control section
269 steering wheel damping section
321 motor velocity command filter section
351 lateral velocity command filter section

The invention claimed is:

1. An electric power steering apparatus that drives a motor based on a motor current command value, and performs assist control and steering angle control to a steering system by driving and controlling said motor, comprising:
   a torque control section that calculates a first motor current command value for said assist control based on at least a steering torque;
   a target steering angle generating section that generates a target steering angle being a target value in said steering angle control based on vehicle information; and a steering angle control section that calculates a second motor current command value for said steering angle control based on at least said target steering angle and an actual steering angle;

wherein said electric power steering apparatus calculates said motor current command value by said first motor current command value and said second motor current command value; and wherein said target steering angle generating section comprises a lateral position control section that calculates a lateral velocity command value by a deviation between a lateral position command value that is obtained based on said vehicle information and a lateral position, a lateral velocity calculating section that calculates a lateral velocity by said lateral position, a lateral velocity control section that calculates a basic target steering angle based on said lateral velocity command value and said lateral velocity, and a vehicle behavior stabilizing section that calculates a compensatory target steering angle for damping by a lateral acceleration that is obtained based on said vehicle information, and generates said target steering angle by said basic target steering angle and said compensatory target steering angle.

2. The electric power steering apparatus according to claim 1, wherein said steering angle control section calculates said second motor current command value in accordance with I-P control based on a motor velocity command value that is calculated using said target steering angle and said actual steering angle.

3. The electric power steering apparatus according to claim 2, wherein said lateral velocity control section calculates said basic target steering angle in accordance with I-P control using said lateral velocity command value and said lateral velocity.

4. The electric power steering apparatus according to claim 2, wherein said vehicle behavior stabilizing section comprises a phase compensating section that performs phase compensation using a phase compensation filter and a gain section that multiplies a gain, and calculates said compensatory target steering angle by said lateral acceleration through said phase compensating section and said gain section.

5. The electric power steering apparatus according to claim 2, wherein said target steering angle generating section further comprises a first limiting section that limits said lateral position command value by a preset first limit value.

6. The electric power steering apparatus according to claim 2, wherein said target steering angle generating section further comprises a rate limiting section that limits a variation of said lateral position command value by a preset rate limit value.

7. The electric power steering apparatus according to claim 2, wherein said target steering angle generating section further comprises a lateral position command vibration eliminating section that reduces a vibration frequency component included in said lateral position command value for said lateral position command value.

8. The electric power steering apparatus according to claim 2, wherein said target steering angle generating section further comprises a lateral velocity command filter section that obtains a compensation value to improve followability of said lateral position to said lateral position command value by said lateral position command value using an FF filter, and compensates said lateral velocity command value by said compensation value.

9. The electric power steering apparatus according to claim 1, wherein said lateral position control section calculates said lateral velocity command value by multiplying said deviation by a proportional gain.

10. The electric power steering apparatus according to claim 2, wherein said lateral position control section calculates said lateral velocity command value by multiplying said deviation by a proportional gain.

11. The electric power steering apparatus according to claim 1, wherein said lateral velocity control section calculates said basic target steering angle in accordance with I-P control using said lateral velocity command value and said lateral velocity.

12. The electric power steering apparatus according to claim 1, wherein said vehicle behavior stabilizing section comprises a phase compensating section that performs phase compensation using a phase compensation filter and a gain section that multiplies a gain, and calculates said compensatory target steering angle by said lateral acceleration through said phase compensating section and said gain section.

13. The electric power steering apparatus according to claim 12, wherein a characteristic of said phase compensation filter is changed depending on a vehicle speed.

14. The electric power steering apparatus according to claim 1, wherein said target steering angle generating section further comprises a first limiting section that limits said lateral position command value by a preset first limit value.

15. The electric power steering apparatus according to claim 1, wherein said target steering angle generating section further comprises a rate limiting section that limits a variation of said lateral position command value by a preset rate limit value.

16. The electric power steering apparatus according to claim 1, wherein said target steering angle generating section further comprises a lateral position command vibration eliminating section that reduces a vibration frequency component included in said lateral position command value for said lateral position command value.

17. The electric power steering apparatus according to claim 16, wherein a characteristic that said lateral position command vibration eliminating section has is changed depending on a vehicle speed.

18. The electric power steering apparatus according to claim 1,
wherein said target steering angle generating section further comprises
a lateral velocity command filter section that obtains a compensation value to improve followability of said lateral position to said lateral position command value by said lateral position command value using an FF filter, and
compensates said lateral velocity command value by said compensation value.

19. The electric power steering apparatus according to claim 18,
wherein a characteristic of said FF filter is changed depending on a vehicle speed.

20. The electric power steering apparatus according to claim 1,
wherein said target steering angle generating section further comprises
a second limiting section that limits said target steering angle by a preset second limit value.

* * * * *